US011150149B2

(12) United States Patent
Matsuda et al.

(10) Patent No.: US 11,150,149 B2
(45) Date of Patent: Oct. 19, 2021

(54) GEAR POSITIONING DEVICE, STRESS MEASUREMENT SYSTEM, GEAR POSITIONING METHOD, AND STRESS MEASUREMENT METHOD

(71) Applicant: SINTOKOGIO, LTD., Nagoya (JP)

(72) Inventors: Kazunori Matsuda, Toyokawa (JP); Takuya Koyama, Toyokawa (JP)

(73) Assignee: SINTOKOGIO, LTD., Nagoya (JP)

( * ) Notice: Subject to any disclaimer, the term of this patent is extended or adjusted under 35 U.S.C. 154(b) by 19 days.

(21) Appl. No.: 16/649,811

(22) PCT Filed: Sep. 3, 2018

(86) PCT No.: PCT/JP2018/032617
§ 371 (c)(1),
(2) Date: Mar. 23, 2020

(87) PCT Pub. No.: WO2019/065107
PCT Pub. Date: Apr. 4, 2019

(65) Prior Publication Data
US 2020/0284670 A1 Sep. 10, 2020

(30) Foreign Application Priority Data

Sep. 29, 2017 (JP) .............................. JP2017-191139

(51) Int. Cl.
*G01M 13/021* (2019.01)
*G01L 1/25* (2006.01)
*G01M 13/025* (2019.01)

(52) U.S. Cl.
CPC ............. *G01L 1/25* (2013.01); *G01M 13/021* (2013.01); *G01M 13/025* (2013.01)

(58) Field of Classification Search
CPC ...... G01L 1/25; G01M 13/021; G01M 13/025
See application file for complete search history.

(56) References Cited

U.S. PATENT DOCUMENTS 4,498,335 A * 2/1985 Thoma ................ G01M 13/021
33/501.9
4,788,856 A * 12/1988 Felger ................. G01M 13/025
73/115.06

(Continued)

FOREIGN PATENT DOCUMENTS

CN 103959010 A 7/2014
CN 105452802 A 3/2016

(Continued)

OTHER PUBLICATIONS

International Preliminary Report on Patentability dated Apr. 9, 2020 for PCT/JP2018/032617.

*Primary Examiner* — Eric S. McCall
(74) *Attorney, Agent, or Firm* — Faegre Drinker Biddle & Reath LLP

(57) ABSTRACT

A gear positioning device according to an embodiment includes: a chuck configured to hold a gear; a rotation drive mechanism configured to rotationally drive the chuck so that the gear rotates around a predetermined rotation axis; a displacement meter configured to continuously or periodically acquire a measurement value representing a distance between a reference point located outside the gear and an outer peripheral surface of the gear while rotating the gear; and a control device configured to set a part of the outer peripheral surface of the gear as a measurement object on the basis of a rotation angle of the gear, the measurement value, and at least one predetermined reference value and control the rotation drive mechanism so that the measurement object is disposed at a reference position.

23 Claims, 10 Drawing Sheets

(56) References Cited

U.S. PATENT DOCUMENTS

| | | | | |
|---|---|---|---|---|
| 4,962,590 A * | 10/1990 | Ambrose | ............... | G01B 5/202 |
| | | | | 33/501.14 |
| 5,271,271 A * | 12/1993 | Frazier | ................ | G01M 13/021 |
| | | | | 33/501.13 |
| 5,513,442 A * | 5/1996 | Flair | ................... | G01M 13/021 |
| | | | | 33/501.19 |
| 2006/0254055 A1 * | 11/2006 | Sabourin | ............. | G01M 13/025 |
| | | | | 29/893.1 |
| 2007/0277610 A1 * | 12/2007 | Landvogt | ........... | G01M 13/021 |
| | | | | 73/587 |
| 2015/0013449 A1 * | 1/2015 | Murata | ............. | G01B 11/2416 |
| | | | | 73/162 |
| 2015/0066390 A1 * | 3/2015 | Chen | .................. | G01M 13/021 |
| | | | | 702/35 |
| 2015/0135820 A1 * | 5/2015 | Muller | ................. | B23F 17/001 |
| | | | | 73/162 |
| 2015/0369696 A1 * | 12/2015 | Poirson | ............... | G01M 13/025 |
| | | | | 73/162 |
| 2017/0212007 A1 * | 7/2017 | Li | ....................... | G01M 13/021 |
| 2018/0322239 A1 * | 11/2018 | Aboumrad | ............. | G06F 30/23 |
| 2019/0143482 A1 * | 5/2019 | Iwata | ........................ | G01L 1/25 |
| | | | | 72/16.3 |
| 2019/0178751 A1 * | 6/2019 | Gravina | ................... | G01N 3/04 |
| 2020/0033110 A1 * | 1/2020 | Shin | .................... | G01B 11/2416 |
| 2020/0319059 A1 * | 10/2020 | Gravina | ............. | G01M 13/021 |

FOREIGN PATENT DOCUMENTS

| | | |
|---|---|---|
| CN | 106796104 A | 5/2017 |
| JP | H4-189451 A | 7/1992 |
| JP | H06-11332 A | 1/1994 |
| JP | H9-174330 A | 7/1997 |
| JP | 2007-222955 A | 9/2007 |
| JP | 2015-222235 A | 12/2015 |
| JP | 6372731 B1 | 8/2018 |

* cited by examiner

Fig.9
(A)
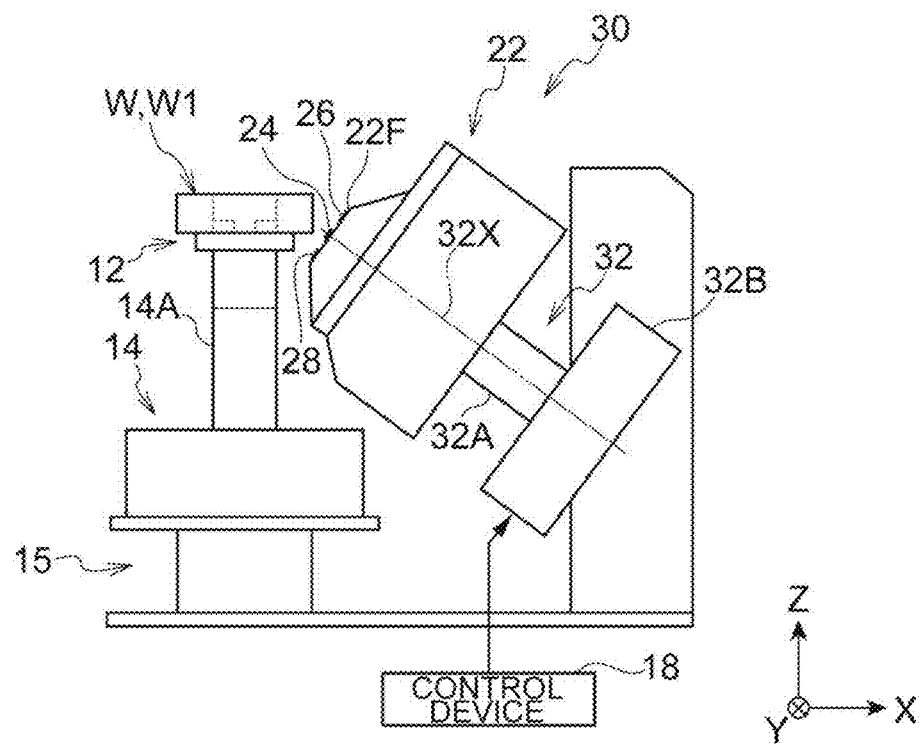
(B)
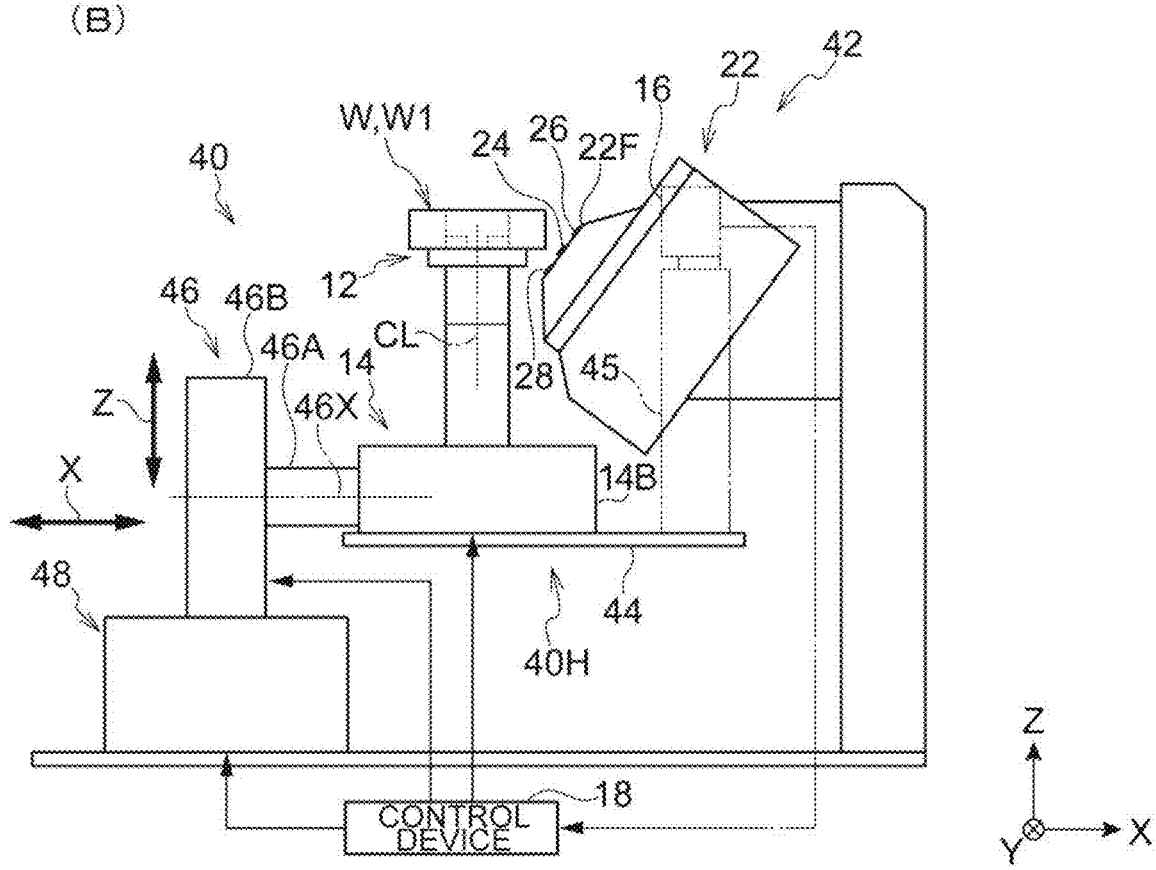

Fig.10
(A)
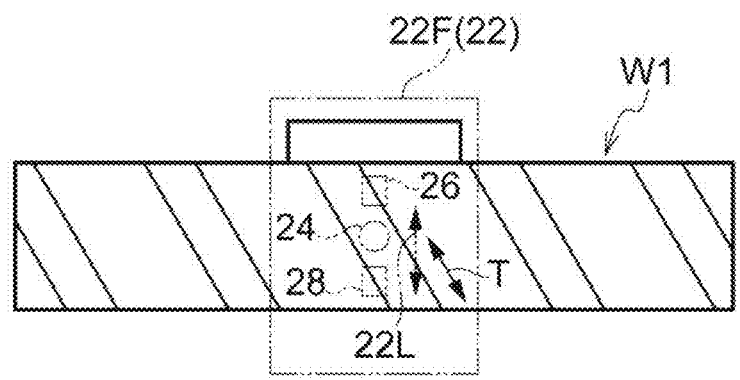
(B)
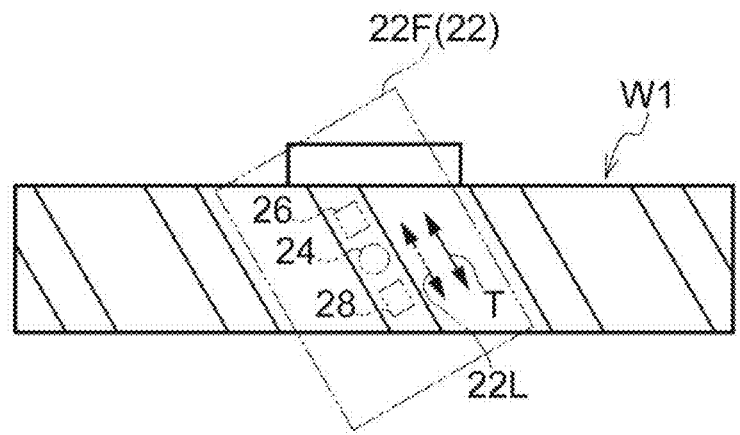

GEAR POSITIONING DEVICE, STRESS MEASUREMENT SYSTEM, GEAR POSITIONING METHOD, AND STRESS MEASUREMENT METHOD

TECHNICAL FIELD

The present disclosure relates to a gear positioning device, a stress measurement system, a gear positioning method, and a stress measurement method.

BACKGROUND ART

A device for positioning an object or performing position adjustment is known. For example, Patent Literature 1 below describes a technique for controlling a rotation angle and an axial position of a drill with a correlation therebetween in order to spray an abrasive along a groove of the drill.

CITATION LIST

Patent Literature

Patent Literature 1: Japanese Unexamined Patent Publication No. 2007-222955

SUMMARY OF INVENTION

Technical Problem

Incidentally, there is a demand for automatically positioning an outer peripheral surface of a gear. However, a method of automatically positioning the outer peripheral surface of the gear is not known.

An object of the present disclosure is to provide a gear positioning device capable of automatically positioning an outer peripheral surface of a gear, a stress measurement system, a gear positioning method, and a stress measurement method.

Solution to Problem

A gear positioning device according to an aspect includes: a chuck configured to hold a gear; a rotation drive mechanism configured to rotationally drive the chuck so that the gear rotates around a predetermined rotation axis; a displacement meter configured to continuously or periodically acquire a measurement value representing a distance between a reference point located outside the gear and an outer peripheral surface of the gear while rotating the gear; and a control device configured to set a part of the outer peripheral surface of the gear as a measurement object on the basis of a rotation angle of the gear, the measurement value, and at least one predetermined reference value and control the rotation drive mechanism so that the measurement object is disposed at a reference position.

In the gear positioning device according to the aspect, a part of the outer peripheral surface of the gear is set as the measurement object from a relationship of the rotation angle of the gear, the measurement value, and the reference value and the rotation drive mechanism is controlled so that the measurement object is disposed at the reference position. Thus, the measurement object can be automatically disposed at the reference position.

In an embodiment, the control device may acquire the rotation angle of the gear when the measurement value matches at least one predetermined reference value and control the rotation drive mechanism so that the part of the outer peripheral surface of the gear is disposed at the reference position on the basis of the acquired rotation angle of the gear.

In the above-described embodiment, a part of the outer peripheral surface of the gear is disposed at the reference position from the rotation angle of the gear when the measurement value matches at least one predetermined reference value. Accordingly, the measurement object of the gear can be automatically disposed at the reference position.

In an embodiment, the at least one reference value may include a plurality of reference values and the control device may have at least one control mode of a first control mode of extracting a first section in which the measurement value increases once and then decreases in response to the rotation of the gear from correlation data representing a relationship between the rotation angle of the gear and the measurement value, specifying a bottom land of the gear on the basis of a first matching point associated with the largest measurement value among a plurality of matching points between the plurality of reference values and the measurement value within the first section, and controlling the rotation drive mechanism so that a part of the bottom land is disposed at the reference position and a second control mode of extracting a second section in which the measurement value decreases once and then increases in response to the rotation of the gear from the correlation data, specifying a top land of the gear on the basis of a second matching point associated with the smallest measurement value among the plurality of matching points between the plurality of reference values and the measurement value within the second section, and controlling the rotation drive mechanism so that a part of the top land is disposed at the reference position.

In the first control mode of the above-described embodiment, since the bottom land of the gear is specified on the basis of the first matching point associated with the largest measurement value among the plurality of matching points between the plurality of reference values and the measurement value within the first section, the bottom land can be specified with high accuracy even when the rotation center of the gear is eccentric. Similarly, in the second control mode, since the top land of the gear is specified on the basis of the second matching point associated with the smallest measurement value among the plurality of matching points between the plurality of reference values and the measurement value within the second section, the top land can be specified with high accuracy even when the rotation center of the gear is eccentric.

In an embodiment, the control device may have the first control mode and in the first control mode, the control device may control the rotation drive mechanism so that a position on the bottom land corresponding to the first matching point is disposed at the reference position. In the embodiment, a region on the side of the tooth surface of the bottom land can be disposed at the reference position.

In an embodiment, the control device may have the first control mode, the first section may include a first region in which the measurement value increases in response to the rotation of the gear and a second region in which the measurement value decreases in response to the rotation of the gear, and in the first control mode, the control device may specify a first rotation angle of the gear corresponding to the first matching point within the first region and a second rotation angle of the gear corresponding to the first matching point within the second region and control the rotation drive mechanism so that a position on the bottom land corresponding to an intermediate rotation angle between the first rotation angle and the second rotation angle is disposed at the reference position. In the embodiment, a center region of the bottom land can be disposed at the reference position.

In an embodiment, the control device may have the second control mode and in the second control mode, the control device may control the rotation drive mechanism so that a position on the top land corresponding to the second matching point is disposed at the reference position. In the embodiment, a region on the side of the tooth surface of the top land can be disposed at the reference position.

In an embodiment, the control device may have the second control mode, the second section may include a third region in which the measurement value decreases in response to the rotation of the gear and a fourth region in which the measurement value increases in response to the rotation of the gear, and in the second control mode, the control device may specify a third rotation angle of the gear corresponding to the second matching point within the third region and a fourth rotation angle of the gear corresponding to the second matching point within the fourth region and control the rotation drive mechanism so that a position on the top land corresponding to an intermediate rotation angle between the third rotation angle and the fourth rotation angle is disposed at the reference position. In the embodiment, a center region of the top land can be disposed at the reference position.

In an embodiment, the displacement meter may be configured to measure the distance between the reference point located outside the gear and the outer peripheral surface of the gear in a non-contact manner. For example, the displacement meter may be an eddy current displacement sensor. By using the non-contact displacement meter, the misalignment caused by the contact between the gear and the displacement meter can be prevented.

In an aspect, a stress measurement system including: the above-described gear positioning device; and a stress measurement device configured to measure a residual stress of the outer peripheral surface of the gear is provided. The stress measurement device includes an X-ray irradiation unit configured to radiate an X-ray to a part of the outer peripheral surface of the gear disposed at the reference position, a first detection element configured to detect an X-ray diffracted in the part of the outer peripheral surface of the gear at a first detection position, and a second detection element configured to detect an X-ray diffracted in the part of the outer peripheral surface of the gear at a second detection position different from the first detection position.

In the stress measurement device according to the aspect, an X-ray is radiated to a part of the outer peripheral surface of the gear disposed at the reference position by the gear positioning device and a diffracted X-ray is detected at the first detection position and the second detection position. Accordingly, the residual stress of a part of the outer peripheral surface of the gear can be measured.

In an embodiment, the X-ray irradiation unit, the first detection element, and the second detection element may be linearly arranged and the stress measurement system may further include a rotation mechanism configured to rotate at least one of the stress measurement device and the chuck so that a direction of a tooth trace of the gear matches an arrangement direction of the X-ray irradiation unit, the first detection element, and the second detection element. In this way, when the direction of the tooth trace of the gear is allowed to match the arrangement direction of the X-ray irradiation unit, the first detection element, and the second detection element, the measurement accuracy of the residual stress can be improved.

In an embodiment, the reference position may be a position facing the X-ray irradiation unit. Accordingly, the residual stress of a part of the gear positioned by the gear positioning device can be measured.

A gear positioning method according to an aspect includes steps of: attaching a gear to a chuck; rotationally driving the chuck so that the gear rotates around a predetermined rotation axis; continuously or periodically acquiring a measurement value representing a distance between a reference point located outside the gear and an outer peripheral surface of the gear while rotating the gear; and setting a part of the outer peripheral surface of the gear as a measurement object on the basis of a rotation angle of the gear, the measurement value, and at least one predetermined reference value and adjusting the rotation angle of the gear so that the measurement object is disposed at a reference position.

In the gear positioning method according to the aspect, a part of the outer peripheral surface of the gear is set as the measurement object from a relationship of the rotation angle of the gear, the measurement value, and the reference value. Thus, the measurement object can be automatically disposed at the reference position.

In the adjusting of the rotation angle of the gear according to the embodiment, the rotation angle of the gear when the measurement value matches the at least one predetermined reference value may be acquired and the rotation angle of the gear may be adjusted so that the part of the outer peripheral surface of the gear is disposed at the reference position on the basis of the acquired rotation angle of the gear.

In the above-described embodiment, the rotation angle of the gear is adjusted so that the part of the outer peripheral surface of the gear is disposed at the reference position from the rotation angle of the gear when the measurement value matches at least one predetermined reference value. Accordingly, the measurement object of the gear can be automatically disposed at the reference position.

In an embodiment, the at least one reference value may include a plurality of reference values and in the step of adjusting of the rotation angle of the gear, a first section in which the measurement value increases once and then decreases in response to the rotation of the gear may be extracted from correlation data representing a relationship between the rotation angle of the gear and the measurement value, a bottom land of the gear may be specified on the basis of a first matching point associated with the largest measurement value among a plurality of matching points between the plurality of reference values and the measurement value within the first section, and the rotation angle of the gear may be adjusted so that a part of the bottom land is disposed at the reference position.

In the above-described embodiment, since the bottom land of the gear is specified on the basis of the first matching point associated with the largest measurement value among the plurality of matching points between the plurality of reference values and the measurement value within the first section, the bottom land can be specified with high accuracy even when the rotation center of the gear is eccentric.

In an embodiment, the at least one reference value may include a plurality of reference values and in the step of adjusting of the rotation angle of the gear, a second section in which the measurement value decreases once and then increases in response to the rotation of the gear may be extracted from correlation data representing a relationship between the rotation angle of the gear and the measurement value, a top land of the gear may be specified on the basis of a second matching point associated with the smallest measurement value among a plurality of matching points between the plurality of reference values and the measurement value within the second section, and the rotation angle of the gear may be adjusted so that a part of the top land is disposed at the reference position.

In the above-described embodiment, since the top land of the gear is specified on the basis of the second matching point associated with the smallest measurement value among the plurality of matching points between the plurality of reference values and the measurement value within the second section, the top land can be specified with high accuracy even when the rotation center of the gear is eccentric.

In the step adjusting of the rotation angle of the gear of the embodiment, the rotation angle of the gear may be adjusted so that a position on the bottom land corresponding to the first matching point is disposed at the reference position. In the embodiment, a region on the side of the tooth surface of the bottom land can be disposed at the reference position.

In an embodiment, the first section may include a first region in which the measurement value increases in response to the rotation of the gear and a second region in which the measurement value decreases in response to the rotation of the gear and in the step of adjusting of the rotation angle of the gear, a first rotation angle of the gear corresponding to the first matching point within the first region and a second rotation angle of the gear corresponding to the first matching point within the second region may be specified and the rotation angle of the gear may be adjusted so that a position on the bottom land corresponding to an intermediate rotation angle between the first rotation angle and the second rotation angle is disposed at the reference position. In the embodiment, a center region of the bottom land can be disposed at the reference position.

In the step of adjusting of the rotation angle of the gear of the embodiment, the rotation angle of the gear is adjusted so that a position on the top land corresponding to the second matching point is disposed at the reference position. In the embodiment, a region on the side of the tooth surface of the top land can be disposed at the reference position.

In an embodiment, the second section may include a third region in which the measurement value decreases in response to the rotation of the gear and a fourth region in which the measurement value increases in response to the rotation of the gear and in the adjusting of the rotation angle of the gear, a third rotation angle of the gear corresponding to the second matching point within the third region and a fourth rotation angle of the gear corresponding to the second matching point within the fourth region may be specified and the rotation angle of the gear may be adjusted so that a position on the top land corresponding to an intermediate rotation angle between the third rotation angle and the fourth rotation angle is disposed at the reference position. In the embodiment, a center region of the top land can be disposed at the reference position.

In an aspect, a stress measurement method of measuring a residual stress of an outer peripheral surface of a gear by a stress measurement device including an X-ray irradiation unit configured to radiate an X-ray to a part of the outer peripheral surface of the gear, a first detection element configured to detect an X-ray diffracted in the part of the outer peripheral surface of the gear at a first detection position, and a second detection element configured to detect an X-ray diffracted in the part of the outer peripheral surface of the gear at a second detection position different from the first detection position is provided. This method includes steps of: attaching the gear to a chuck; rotationally driving the chuck so that the gear rotates around a predetermined rotation axis; continuously or periodically acquiring a measurement value representing a distance between a reference point located outside the gear and an outer peripheral surface of the gear while rotating the gear; setting a part of the outer peripheral surface of the gear as a measurement object on the basis of a rotation angle of the gear, the measurement value, and at least one predetermined reference value and adjusting the rotation angle of the gear so that the measurement object is disposed at a position facing the X-ray irradiation unit; radiating an X-ray from the X-ray irradiation unit toward the measurement object; detecting an X-ray diffracted in the measurement object by the first detection element and the second detection element; and measuring a residual stress of the measurement object on the basis of detection values of the first detection element and the second detection element.

In the method according to the aspect, an X-ray is radiated to a part of the outer peripheral surface of the gear disposed at the reference position by the gear positioning device and a diffracted X-ray at the first detection position and the second detection position is detected. Accordingly, it is possible to measure the residual stress in a part of the outer peripheral surface of the gear.

In the step of adjusting of the rotation angle of the gear of the embodiment, the rotation angle of the gear when the measurement value matches the at least one predetermined reference value may be acquired and the rotation angle of the gear may be adjusted so that the part of the outer peripheral surface of the gear is disposed at a position facing the X-ray irradiation unit on the basis of the acquired rotation angle of the gear.

In the above-described embodiment, the part of the outer peripheral surface of the gear is disposed at a position facing the X-ray irradiation unit from the rotation angle of the gear when the measurement value matches at least one predetermined reference value. Accordingly, the stress of the measurement object can be measured by automatically disposing the measurement object at a position facing the X-ray irradiation unit.

In an embodiment, the X-ray irradiation unit, the first detection element, and the second detection element may be linearly arranged and the stress measurement method may further include rotating at least one of the stress measurement device and the chuck so that a direction of a tooth trace of the gear matches an arrangement direction of the X-ray irradiation unit, the first detection element, and the second detection element before the irradiation of the X-ray. In this way, when the direction of the tooth trace of the gear is allowed to match the arrangement direction of the X-ray irradiation unit, the first detection element, and the second detection element, the measurement accuracy of the residual stress can be improved.

Advantageous Effects of Invention

According to an aspect of the invention and various embodiments, the gear can be automatically positioned.

BRIEF DESCRIPTION OF DRAWINGS

FIG. 9 is a side view schematically illustrating a stress measurement system according to a modified example.

FIG. 10 is a diagram illustrating a direction of a tooth trace of a helical gear and extension directions of an X-ray irradiation unit, a first detection element, and a second detection element.

DESCRIPTION OF EMBODIMENTS

Figure 1:
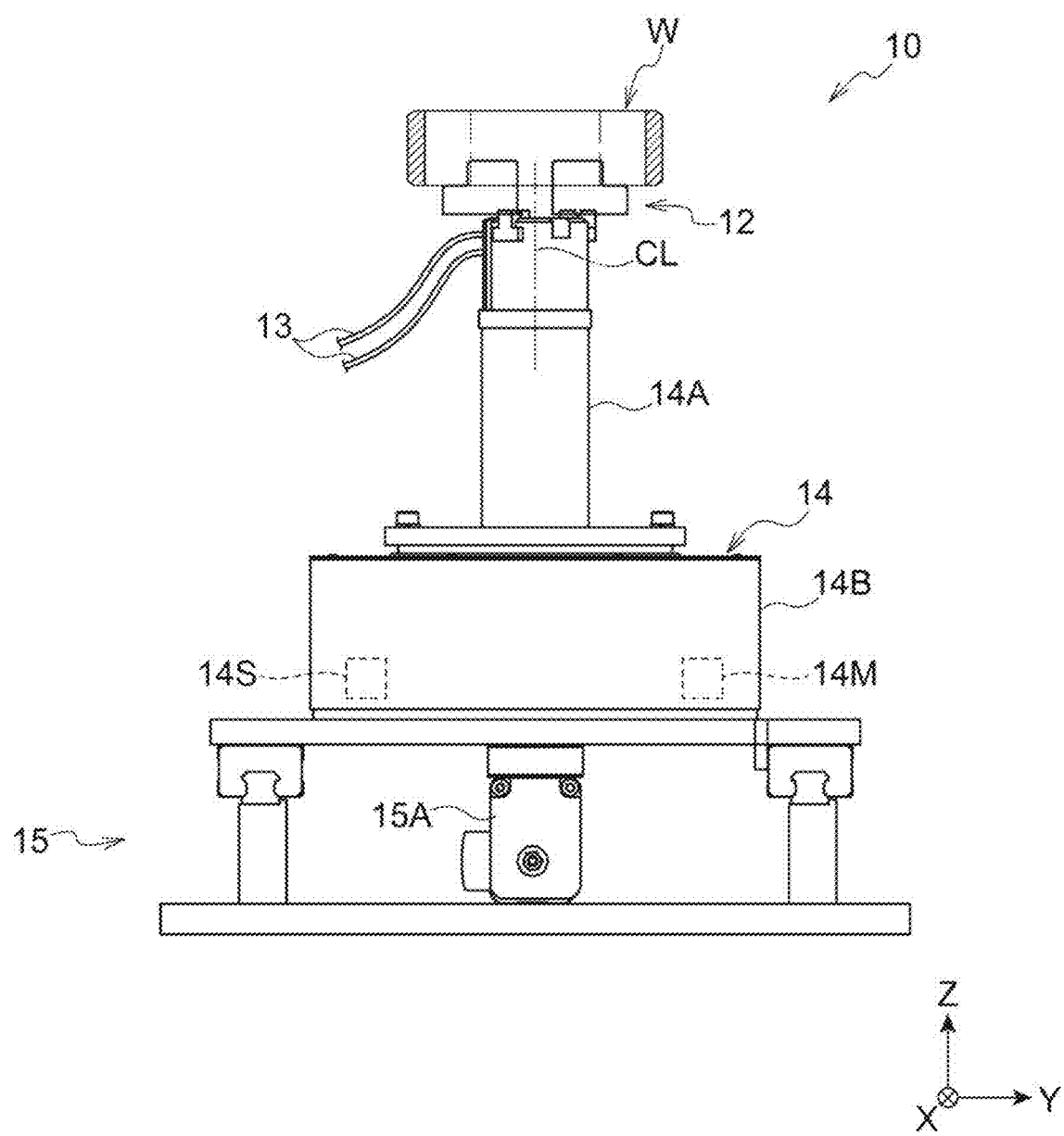
FIG. 1 is a front view illustrating a gear positioning device according to an embodiment.
Figure 2:
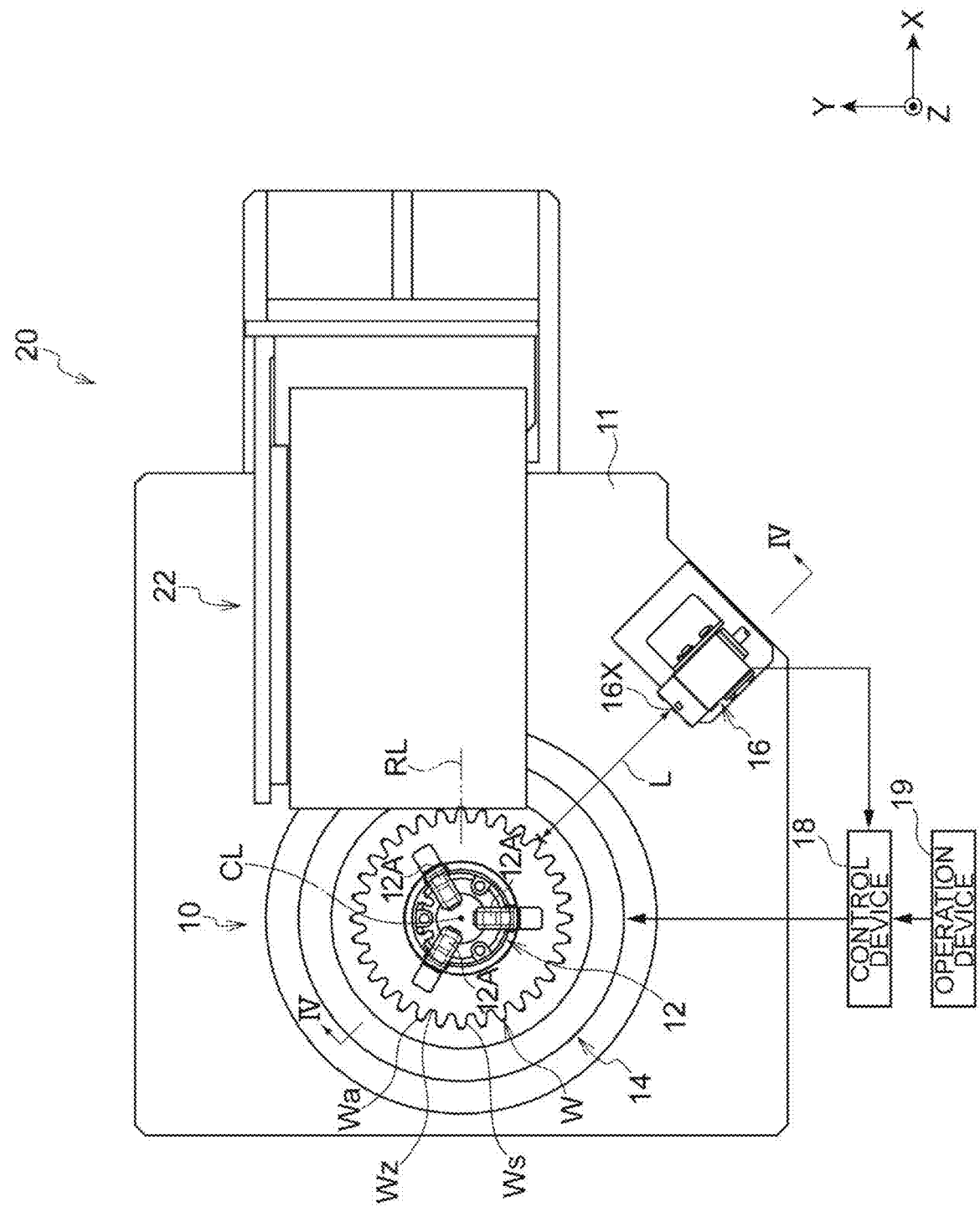
FIG. 2 is a plan view illustrating a stress measurement system according to the embodiment.
Figure 3:
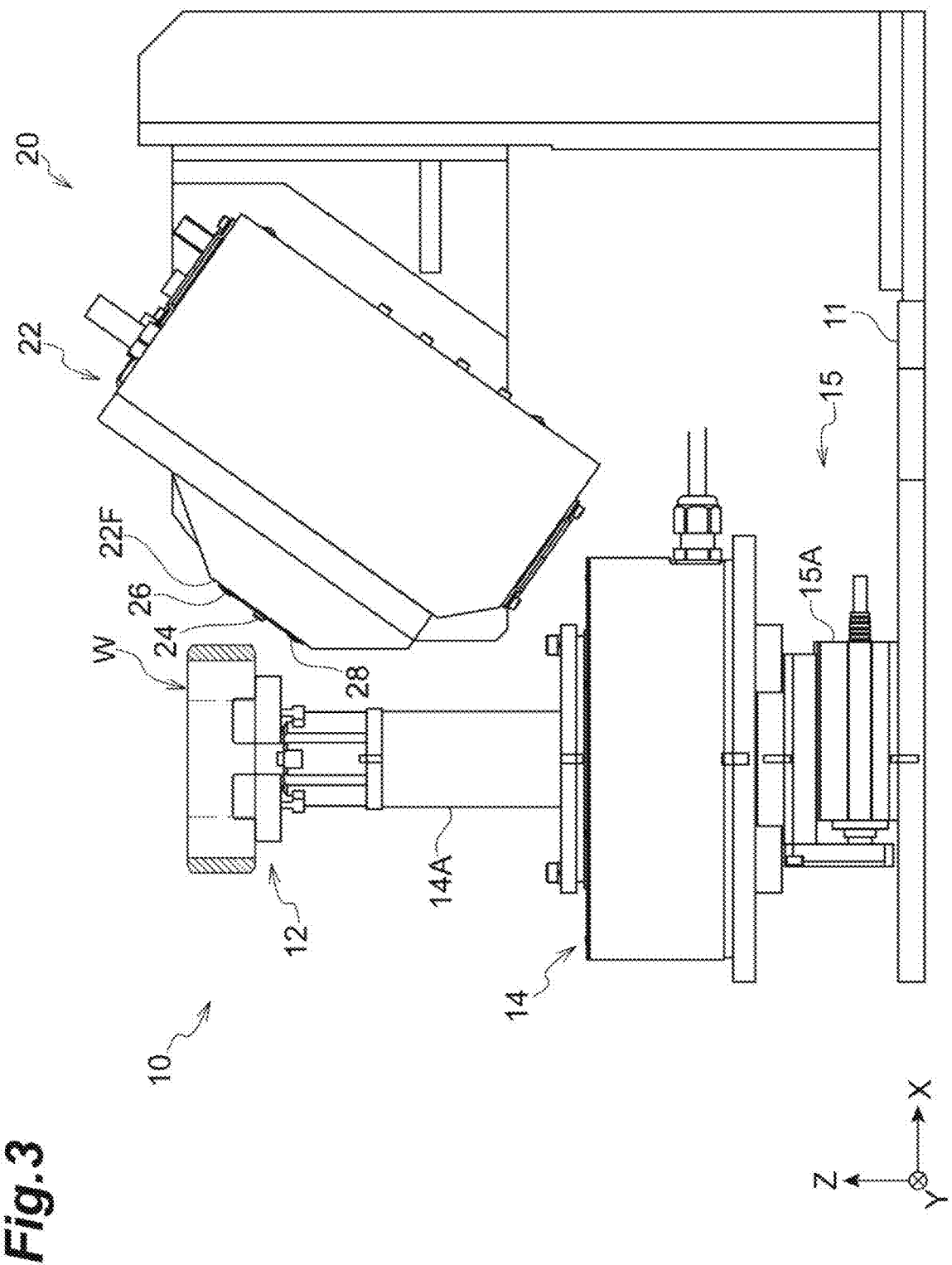
FIG. 3 is a side view of the stress measurement system according to the embodiment.
Figure 4:
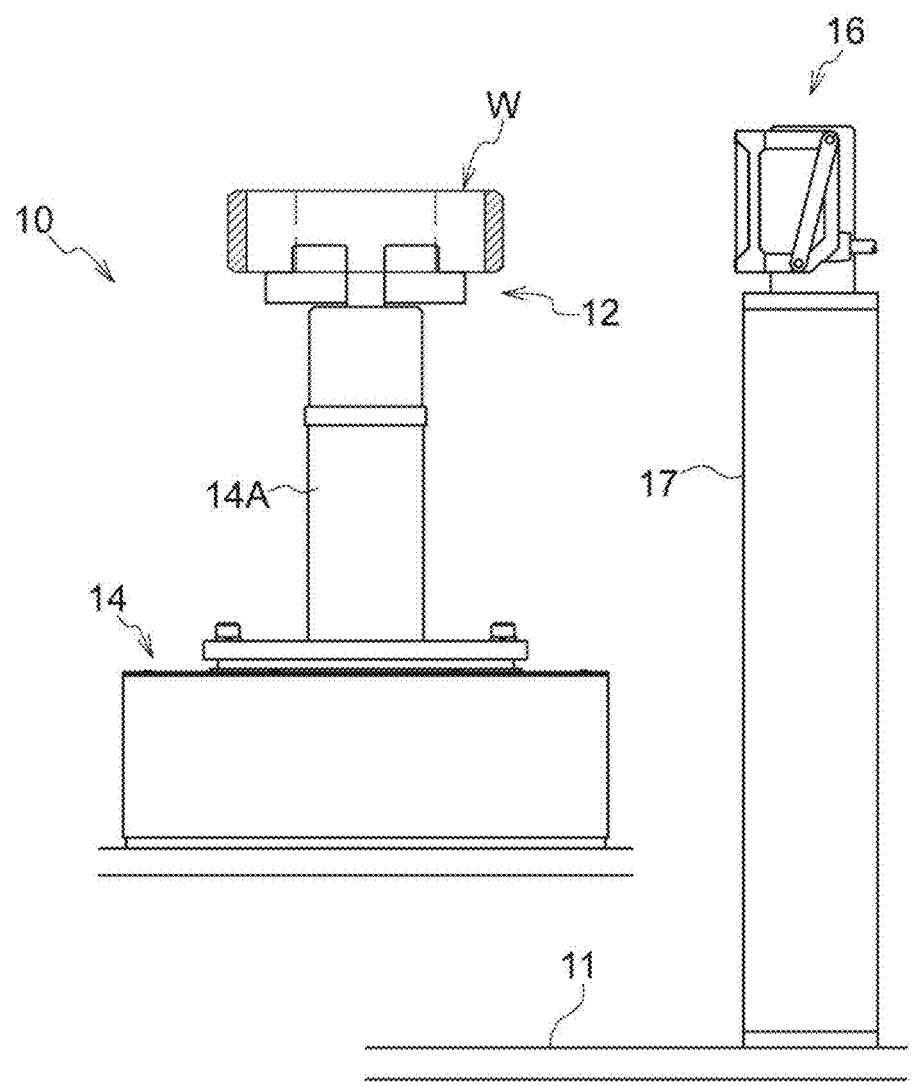
FIG. 4 is a schematic cross-sectional view taken along line IV-IV of FIG. 2.

Hereinafter, various embodiments will be described in detail with reference to the drawings. Additionally, the same reference numerals will be given to the same or equivalent components of the drawings. FIG. 1 is a front view illustrating a gear positioning device 10 according to an embodiment. FIG. 2 is a plan view illustrating a stress measurement system 20 according to the embodiment. FIG. 3 is a side view illustrating the stress measurement system 20 according to the embodiment. In FIGS. 1 to 3, a horizontal direction is depicted as the X direction and the Y direction and a vertical direction is depicted as the Z direction. FIG. 4 is a schematic cross-sectional view taken along line IV-IV of FIG. 2.

(Configuration of Stress Measurement System)

As illustrated in FIG. 1, the gear positioning device 10 includes a chuck 12, a rotation drive mechanism 14, and a slide mechanism 15. The chuck 12 is a member for holding a gear W and is rotatable around an axis CL. The gear W which is held by the chuck 12 has a rotation axis which matches the axis CL. As illustrated in FIG. 2, a bottom land Wz and a top land Wa are alternately formed on the outer peripheral surface of the gear W and the bottom land Wz and the top land Wa are connected to each other through a tooth surface Ws. A through-hole which penetrates the gear W in the direction of the axis CL may be formed at the center position of the gear W in the radial direction.

The chuck 12 is formed in a columnar shape or a disk shape and its upper surface is provided with a plurality of claw portions 12A arranged in the circumferential direction of the axis CL. In the embodiment illustrated in FIG. 2, the chuck 12 includes three claw portions 12A. These claw portions 12A are movable in the radial direction of the axis CL. In an embodiment, the chuck 12 may be an air chuck that moves the position of the claw portion 12A in the radial direction of the chuck 12 by compressed air. In this case, a compressor is connected to the chuck 12 through a hose. The gear W is supported by the upper surface of the chuck 12 so that the rotation axis of the gear W matches the axis CL. For example, the claw portion 12A is inserted into the through-hole of the gear W and the gear W is fixed to the chuck 12 when these claw portions 12A move outward in the radial direction. Additionally, an arbitrary chuck which is different from the air chuck can be used as the chuck 12. Further, in an embodiment, a sensor detecting a radial position of the claw portion 12A and a wiring 13 connected to the sensor may be provided. Additionally, for convenience of description, the chuck 12 is illustrated through a part of the gear W in FIG. 2.

The rotation drive mechanism 14 is a device that rotationally drives the chuck 12 so that the gear W rotates around the axis CL. The rotation drive mechanism 14 includes a rotation shaft 14A and a casing 14B. The rotation shaft 14A extends in the direction of the axis CL, that is, the up and down direction of the gear positioning device 10 and its upper end is connected to the chuck 12. The lower end of the rotation shaft 14A is connected to a bearing provided inside the casing 14B. This bearing rotatably supports the rotation shaft 14A. Further, a motor 14M is provided inside the casing 14B. The motor 14M applies a driving force to the rotation shaft 14A through a driving force transmission mechanism. The rotation shaft 14A rotates around the axis CL by the driving force transmitted from the motor 14M. The rotation force of the rotation shaft 14A is transmitted to the chuck 12 so that the chuck 12 and the gear W rotate around the axis CL. The motor 14M is electrically connected to a control device 18 and its operation is controlled by receiving a control signal transmitted from the control device 18.

As will be described later, the control device 18 controls the motor 14M of the rotation drive mechanism 14 so that the rotation angle of the gear W becomes a desired rotation angle. For example, the control device 18 performs control of rotating the gear W by a predetermined unit angle a plurality of times so that the rotation angle of the gear W becomes a desired rotation angle. Additionally, in an embodiment, the rotation drive mechanism 14 may further include a rotation angle detection sensor 14S that detects the rotation angle of the gear W. The rotation angle detection sensor 14S detects the rotation angle of the gear W from the rotation angle of the rotation shaft 14A and transmits information representing the detected rotation angle to the control device 18.

Additionally, in an embodiment, the rotation angle of the chuck 12 may be limited to a predetermined rotation angle range in order to prevent the wiring 13 from being entangled with the rotation shaft 14A. Further, the rotation shaft 14A of the rotation drive mechanism 14 is rotatable in both of clockwise and counter-clockwise directions with respect to the axis CL.

The slide mechanism 15 includes an electric cylinder 15A. The electric cylinder 15A moves the rotation drive mechanism 14 in the X direction by controlling, for example, the expansion and contraction of the cylinder in accordance with the rotation of the motor.

As illustrated in FIG. 4, the gear positioning device 10 further includes a support 17 erected on the base 11. The support 17 extends upward from the base 11 and a displacement meter 16 is fixed to its upper end. The displacement meter 16 is disposed outside the gear W held by the chuck 12. The displacement meter 16 has a reference point 16X located outside the gear W and acquires a measurement value representing a distance L between the reference point 16X and the outer peripheral surface of the gear W (see FIG. 2). Additionally, the displacement meter 16 may continuously acquire the measurement value or may periodically acquire the measurement value at a predetermined time interval. In an embodiment, the displacement meter 16 may be a non-contact displacement meter that measures the distance L between the reference point 16X and the outer peripheral surface in a non-contact manner. As the non-contact displacement meter, a laser displacement sensor and an eddy current displacement meter are exemplified. The eddy current displacement meter is a non-optical displacement meter that detects the distance L from the reference point 16X to the outer peripheral surface of the gear W without radiating light to the outer peripheral surface of the gear W. Additionally, the displacement meter 16 may measure a displacement from a reference position instead of the distance L. The displacement meter 16 is electrically connected to the control device 18 to be described later.

The gear positioning device 10 further includes the control device 18. The control device 18 is a computer that includes a processor, a storage unit, and the like and controls each component of the stress measurement system 20. The control device 18 is electrically connected to the rotation drive mechanism 14 and the displacement meter 16. The control device 18 transmits a control signal to the rotation drive mechanism 14 so that the gear W rotates around the axis CL. Further, the control device 18 acquires the measurement value representing the distance L from the displacement meter 16 while rotating the gear W around the axis CL. Then, a part of the outer peripheral surface of the gear W is set as a measurement object on the basis of the rotation angle of the gear W, the measurement value of the displacement meter 16, and at least one predetermined reference value. More specifically, the control device 18 acquires the rotation angle of the gear W when the measurement value acquired from the displacement meter 16 matches a predetermined reference value and sets a part of the outer peripheral surface of the gear W as a measurement object on the basis of the acquired rotation angle of the gear W. Further, the control device 18 controls the rotation drive mechanism 14 so that the set measurement object is disposed at a reference position RL.

An operation device 19 is connected to the control device 18. The operation device 19 includes a display device and an input/output device and is able to input a plurality of reference values to be described later by an operator. Further, the operation device 19 receives a control mode selected by the operator and transmits a signal to the control device 18 so that the gear positioning device 10 is operated in the selected control mode.

Figure 5:
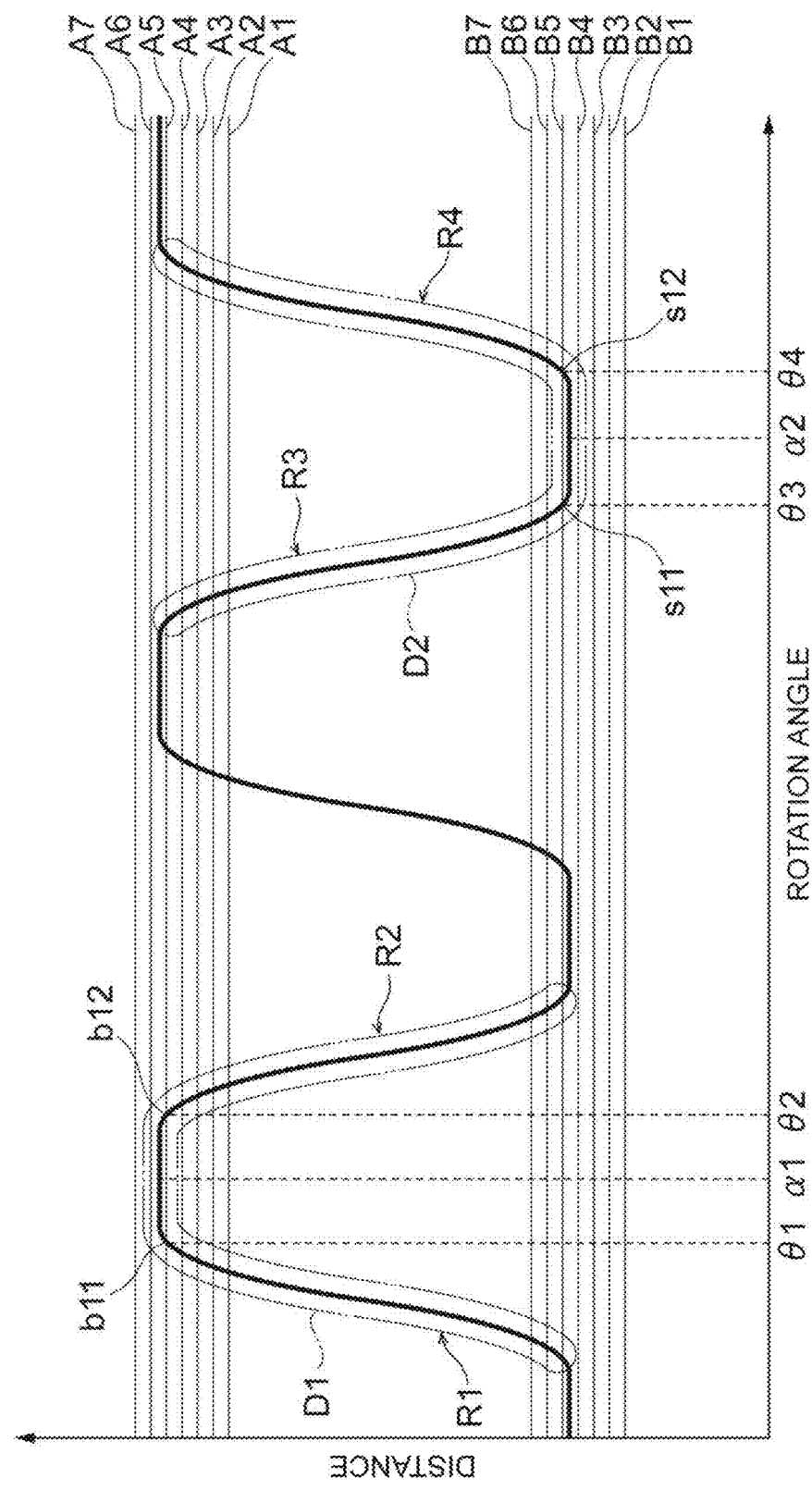
FIG. 5 is a graph showing a relationship between a measurement value of a displacement meter and a rotation angle of a gear.
Figure 6:
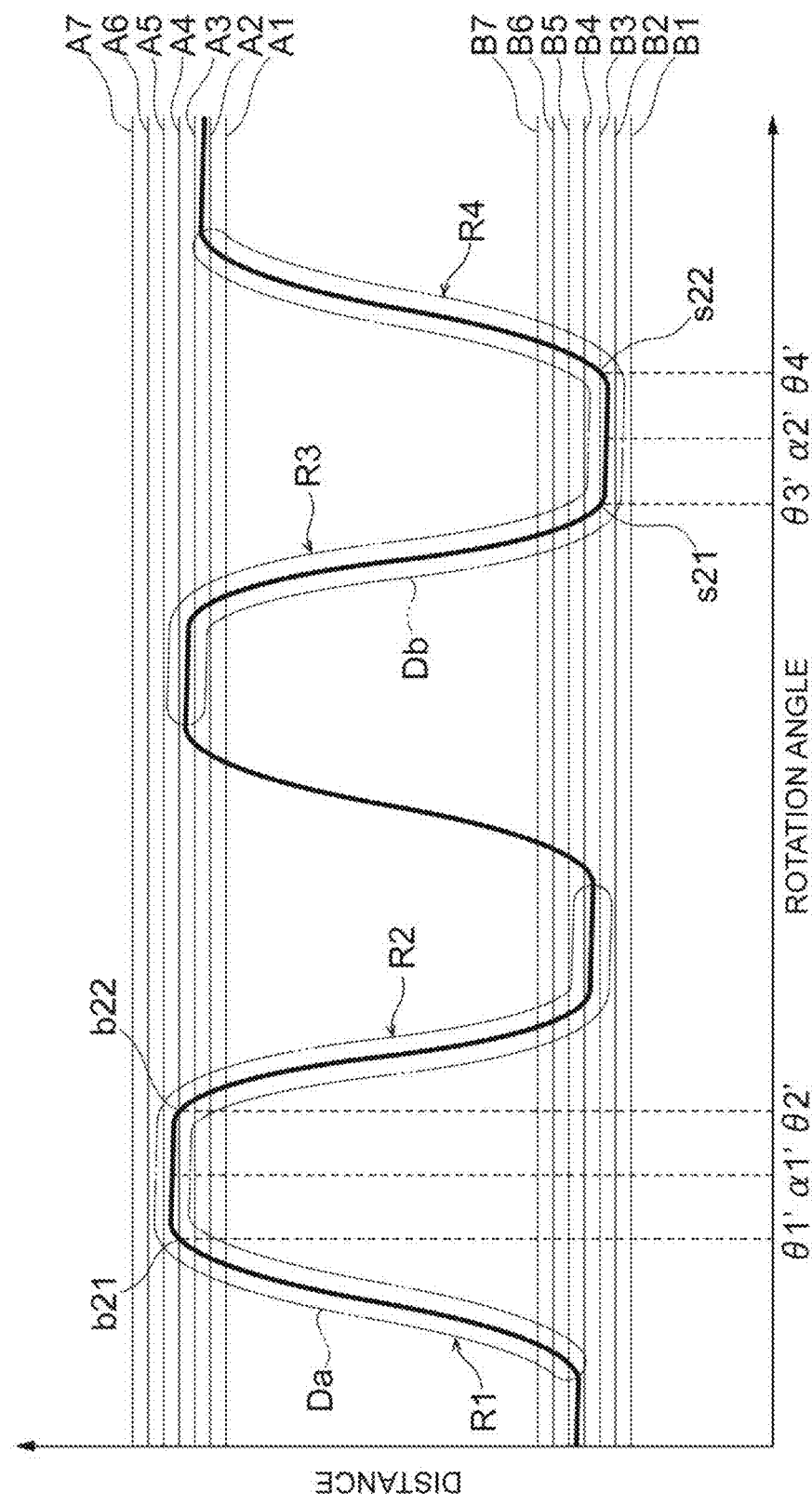
FIG. 6 is a graph showing the relationship between the measurement value of the displacement meter and the rotation angle of the gear.

Referring to FIGS. 5 and 6, the measurement value of the displacement meter 16 will be described. FIGS. 5 and 6 are graphs of correlation data showing a relationship between the rotation angle of the gear W and the measurement value of the displacement meter 16, the horizontal axis indicates the rotation angle of the gear W, and the vertical axis indicates the distance L between the reference point 16X and the outer peripheral surface of the gear W. For example, these graphs are generated in such a manner that the control device 18 acquires the measurement value representing the distance L between the reference point 16X and the outer peripheral surface of the gear W from the displacement meter 16 while changing the rotation angle of the gear W by a predetermined unit angle. FIG. 5 is an example of the measurement value when the gear W of which the rotation center is not eccentric with respect to the axis CL is used as a measurement object and FIG. 6 is an example of the measurement value when the gear W of which the rotation center is eccentric with respect to the axis CL is used as a measurement object. Additionally, the measurement value shown in FIGS. 5 and 6 includes a section in which the measurement value is flat at positions corresponding to the bottom land Wz and the top land Wa, but may not include the flat section in accordance with the shape of the gear W of the measurement object. In the embodiment shown in FIGS. 5 and 6, reference values A1, A2, A3, A4, A5, A6, A7, B1, B2, B3, B4, B5, B6, and B7 (hereinafter, referred to as "reference values A1 to A7 and B1 to B7") are set as the plurality of reference values.

In an embodiment, the control device 18 can have a first control mode and a second control mode. The control device 18 can control the operation of the gear positioning device 10 in the control mode selected by the operator in the first control mode and the second control mode.

First, the first control mode will be described. In the first control mode, the bottom land Wz of the gear W is specified and the rotation angle of the gear W is controlled so that a part of the bottom land Wz is disposed at the reference position RL. In the first control mode, the control device 18 extracts the first sections D1 and Da in which the measurement value increases once and then decreases in response to the rotation of the gear W from the correlation data shown in FIGS. 5 and 6. Next, the control device 18 extracts a plurality of matching points between the measurement value within the first sections D1 and Da and the plurality of reference values A1 to A7 and B1 to B7 and specifies the first matching point associated with the largest measurement value among the plurality of matching points. Here, the matching point is a point in which the measurement value is the same as the reference values A1 to A7 and B1 to B7 in the correlation data. In other words, the matching point means an intersection point between the measurement value and the reference values A1 to A7 and B1 to B7. Additionally, the control device 18 may specify a point in which the measurement value is completely the same as the reference values A1 to A7 and B1 to B7 and a point in which a difference between the measurement value and the reference values A1 to A7 and B1 to B7 is smaller than a predetermined threshold value as matching points. In the example of FIG. 5, the reference values A1, A2, A3, A4, A5, B5, B6, and B7 have matching points with respect to the measurement value within the first section D1. Among the matching points, the matching points having the largest reference value are matching points b11 and b12 between the reference value A5 and the measurement value within the first section D1. Thus, the control device 18 sets the matching points b11 and b12 as first matching points. Similarly, in the example of FIG. 6, matching points b21 and b22 having the largest measurement values among the plurality of matching points between the measurement value within the first section Da and the plurality of reference values A1 to A7 and B1 to B7 are set as first matching points. The control device 18 acquires the rotation angle of the gear W corresponding to the first matching points b11 and b12 and specifies the range of the bottom land Wz from the rotation angle. Similarly, the control device 18 acquires the rotation angle of the gear W corresponding to the first matching points b21 and b22 and specifies the range of the bottom land Wz from the rotation angle. Then, the control device 18 sets a part of the specified bottom land Wz as the measurement object and controls the rotation drive mechanism 14 so that the measurement object is disposed at the reference position RL.

A method of determining a specific object in the first control mode will be described in more detail. In the first control mode, a first or second method to be described later is used as a method of determining a specific object. In the first method, the control device 18 specifies a first rotation angle θ1 corresponding to the first matching point b11 located within the first region R1 in which the measurement value increases in the first section D1 and a second rotation angle θ2 corresponding to the first matching point b12 located within the second region R2 in which the measurement value decreases in the first section D1 (see FIG. 5).

Next, the control device 18 obtains an intermediate rotation angle α1 between the first rotation angle θ1 and the second rotation angle θ2. The control device 18 controls the rotation drive mechanism 14 so that the position on the bottom land Wz corresponding to the rotation angle α1 is disposed at the reference position RL. Similarly, the control device 18 specifies a first rotation angle θ1' corresponding to the first matching point b21 located within the first region R1 in which the measurement value increases in the first section Da and a second rotation angle θ2' corresponding to the first matching point b22 located within the second region R2 in which the measurement value decreases in the first section Da (see FIG. 6). Next, the control device 18 obtains an intermediate rotation angle α1' between the first rotation angle θ1' and the second rotation angle θ2'. The control device 18 controls the rotation drive mechanism 14 so that the position on the bottom land Wz corresponding to the rotation angle α1' is disposed at the reference position RL. In the first method, a center region of the bottom land Wz is disposed at the reference position RL.

In the second method of determining the specific object, the first rotation angle θ1 corresponding to the first matching point b11 and the second rotation angle θ2 corresponding to the first matching point b12 are specified and the rotation drive mechanism 14 is controlled so that the position on the bottom land Wz corresponding to any one of the first rotation angle θ1 and the second rotation angle θ2 is disposed at the reference position RL. Similarly, the first rotation angle θ1' corresponding to the first matching point b21 and the second rotation angle θ2' corresponding to the first matching point b22 are specified and the rotation drive mechanism 14 is controlled so that the position on the bottom land Wz corresponding to any one of the first rotation angle θ1' and the second rotation angle θ2' is disposed at the reference position RL. In the second method, a region on the side of the tooth surface Ws of the bottom land Wz is disposed at the reference position RL.

Next, the second control mode will be described. In the second control mode, the top land Wa of the gear W is specified and the rotation angle of the gear W is controlled so that a part of the top land Wa is disposed at the reference position RL. In the second control mode, the control device 18 extracts the second sections D2 and Db in which the measurement value decreases once and then increases in response to the rotation of the gear W from the correlation data shown in FIGS. 5 and 6. Next, the control device 18 extracts a plurality of matching points (intersection points) between the measurement value within the second sections D2 and Db and the plurality of reference values A1 to A7 and B1 to B7 and specifies the second matching point associated with the smallest measurement value among the plurality of matching points. In the example of FIG. 5, the reference values A1, A2, A3, A4, A5, B5, B6, and B7 have matching points with respect to the measurement value within the second section D2. Among these matching points, the matching points having the smallest reference value are matching points s11 and s12 between the reference value B5 and the measurement value within the second section D2. Thus, the control device 18 sets the matching points s11 and s12 as the second matching points. Similarly, in the example of FIG. 6, matching points s21 and s22 having the smallest measurement value among the plurality of matching points between the measurement value within the second section Db and the plurality of reference values A1 to A7 and B1 to B7 are set as second matching points. The control device 18 acquires the rotation angle of the gear W corresponding to the second matching points s11 and s12 and specifies the range of the top land Wa from the rotation angle. Similarly, the control device 18 acquires the rotation angle of the gear W corresponding to the second matching points s21 and s22 and specifies the range of the top land Wa from the rotation angle. Then, the control device 18 sets a part of the specified top land Wa as the measurement object and controls the rotation drive mechanism 14 so that the measurement object is disposed at the reference position RL.

A method of determining a specific object in the second control mode will be described in more detail. In the second control mode, a third or fourth method to be described later is used as the method of determining the specific object. In the third method, the control device 18 specifies a third rotation angle θ3 corresponding to the second matching point s11 located within the third region R3 in which the measurement value decreases in the second section D2 and a fourth rotation angle θ4 corresponding to the second matching point s12 located within the fourth region R4 in which the measurement value increases in the second section D2 (see FIG. 5). Next, the control device 18 obtains an intermediate rotation angle α2 between the third rotation angle θ3 and the fourth rotation angle θ4. The control device 18 controls the rotation drive mechanism 14 so that the position on the top land Wa corresponding to the rotation angle α2 is disposed at the reference position RL. Similarly, the control device 18 specifies a third rotation angle θ3' corresponding to the second matching point s21 located within the third region R3 in which the measurement value decreases in the second section Db and a fourth rotation angle θ4' corresponding to the second matching point s22 located within the fourth region R4 in which the measurement value increases in the second section Db (see FIG. 6). Next, the control device 18 obtains an intermediate rotation angle α2' between the third rotation angle θ3' and the fourth rotation angle θ4'. The control device 18 controls the rotation drive mechanism 14 so that the position on the top land Wa corresponding to the rotation angle α2' is disposed at the reference position RL. In the third method, a center region of the top land Wa is disposed at the reference position RL.

In the fourth method of determining the specific object, the third rotation angle θ3 corresponding to the second matching point s11 and the fourth rotation angle θ4 corresponding to the second matching point s12 are specified and the rotation drive mechanism 14 is controlled so that the position on the top land Wa corresponding to any one of the third rotation angle θ3 and the fourth rotation angle θ4 is disposed at the reference position RL (see FIG. 5). Similarly, the third rotation angle θ3' corresponding to the second matching point s21 and the fourth rotation angle θ4' corresponding to the second matching point s22 are specified and the rotation drive mechanism 14 is controlled so that the position on the top land Wa corresponding to any one of the third rotation angle θ3' and the fourth rotation angle θ4' is disposed at the reference position RL (see FIG. 6). In the fourth method, a region on the side of the tooth surface Ws of the top land Wa is disposed at the reference position RL.

Next, the stress measurement system 20 will be described with reference to FIG. 3.

The stress measurement system 20 includes the gear positioning device 10 and the stress measurement device 22. The stress measurement device 22 is a device that measures the residual stress of the outer peripheral surface of the gear W and is disposed outside the gear W held by the chuck 12.

The stress measurement device 22 includes an X-ray irradiation unit 24, a first detection element 26, and a second detection element 28. The X-ray irradiation unit 24, the first detection element 26, and the second detection element 28 are provided on a front surface 22F of the stress measurement device 22. The X-ray irradiation unit 24 is a device that radiates an X-ray toward the outer surface of the gear W to be inspected. More specifically, the X-ray irradiation unit 24 radiates an X-ray to the measurement object of the gear W. That is, the X-ray irradiation unit 24 and the reference position RL are provided at the facing positions. The first detection element 26 is a device that detects an X-ray diffracted on the outer surface of the gear W at the first detection position. The second detection element 28 is a device that detects an X-ray diffracted on the outer surface of the gear W at the second detection position different from the first detection position. In an embodiment, the X-ray irradiation unit 24, the first detection element 26, and the second detection element 28 may be arranged linearly (see FIG. 10(A)). Additionally, a known residual stress measurement device is disclosed in Japanese Unexamined Patent Publication No. 2017-009356 and a detailed description of the residual stress measurement device will be omitted in the present disclosure.

(Gear Positioning Method)

Next, a gear positioning method according to the embodiment will be described.

Figure 7:
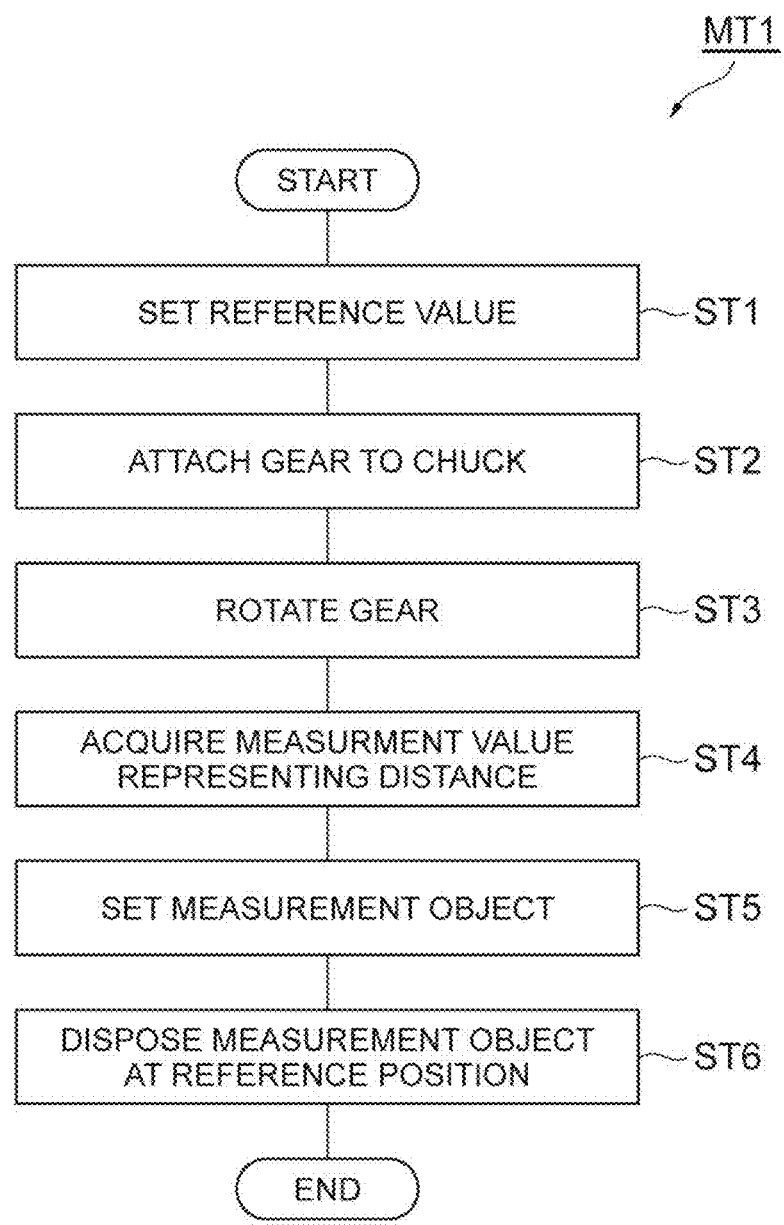
FIG. 7 is a flowchart illustrating a gear positioning method according to the embodiment.

FIG. 7 is a flowchart illustrating a gear positioning method MT1 of the embodiment. In the method MT1, a plurality of reference values are first set in step ST1. The plurality of reference values may be values set by the operator or values automatically generated on the basis of the distance L between the reference point 16X and the outer peripheral surface of the gear W. For example, the control device 18 sets a value slightly smaller than the distance between the reference point 16X and the bottom land Wz of the gear W as the reference value A1. Next, the reference value A(n+1) (n=1, 2, 3 may be obtained from the following equation (1).

$$A(n+1) = A1 + C \cdot n \quad (1)$$

Similarly, the control device 18 sets a value slightly smaller than the distance between the reference point 16X and the top land Wa of the gear W as the reference value B1. Next, the reference value B(n+1) (n=1, 2, 3 . . . ) may be obtained from the following equation (2).

$$B(n+1) = B1 + C \cdot n \quad (2)$$

Additionally, in the equations (1) and (2), C denotes a constant. That is, the plurality of reference values An and Bn are values set with the increment of a predetermined constant C.

Further, the plurality of reference values may be set as below. First, the control device 18 continuously or periodically measures the distance L between the outer peripheral surface of the gear W and the reference point 16X by the displacement meter 16 while rotating the gear W held by the chuck 12. Next, the control device 18 records the value of the distance from the reference point 16X to the top land Wa of the gear W a plurality of times, obtains an average value or minimum value thereof, and sets the average value or minimum value as a minimum reference value. Further, the control device 18 records the value of the distance from the reference point 16X to the bottom land Wz of the gear W a plurality of times, obtains an average value or maximum value thereof, and sets the average value or maximum value as a maximum reference value. Then, a plurality of (as an example, about twenty) reference values may be equally allocated from the minimum reference value to the maximum reference value.

In the method MT1, step ST2 is performed subsequently. In step ST2, the gear W is attached to the chuck. For example, in step ST2, the gear W is placed on the chuck 12 while the rotation axis of the gear W matches the axis CL. Next, the claw portion 12A of the chuck 12 moves outward in the radial direction of the gear W so that the gear W is fixed to the chuck 12. Additionally, in step ST2, the gear W may be attached after the rotation drive mechanism 14 moves in the X direction by the slide mechanism 15. Next, in step ST3, the chuck 12 is rotationally driven so that the gear W rotates around the axis CL.

Next, step ST4 is performed. In step ST4, the displacement meter 16 acquires the measurement value representing the distance L between the reference point 16X located outside the gear W and the outer peripheral surface of the gear W while the gear W rotates. This measurement may be continuously performed or may be periodically performed at a predetermined time interval.

Next, step ST5 is performed. In step ST5, a part of the outer peripheral surface of the gear W is set as the measurement object from the rotation angle of the gear W when the measurement value of the displacement meter 16 matches the reference values A1 to A7 and B1 to B7. In step ST5, since the control device 18 is operated in the first control mode or the second control mode, a part of the outer peripheral surface of the gear W is set as the measurement object. In subsequent step ST6, the rotation drive mechanism 14 is controlled so that the measurement object of the gear W is stopped at the reference position RL, for example, a position facing the X-ray irradiation unit 24.

Additionally, when the control device 18 is operated in the first control mode, the rotation angle of the gear W is controlled so that a part of the bottom land Wz is disposed at the reference position RL in step ST6. When the measurement value shown in FIG. 5 is described as an example, in the first method of the first control mode, the position on the bottom land Wz corresponding to the rotation angle $\alpha 1$ is disposed at the reference position RL. Further, in the second method of the first control mode, the position on the bottom land Wz corresponding to any one of the first rotation angle $\theta 1$ and the second rotation angle $\theta 2$ is disposed at the reference position RL.

Further, when the control device 18 is operated in the second control mode, the rotation angle of the gear W is controlled so that a part of the top land Wa is disposed at the reference position RL in step ST6. When the measurement value shown in FIG. 5 is described as an example, in the third method of the second control mode, the rotation drive mechanism 14 is controlled so that the position on the top land Wa corresponding to the rotation angle $\alpha 2$ is disposed at the reference position RL. Further, in the fourth method of the second control mode, the rotation drive mechanism 14 is controlled so that the position on the top land Wa corresponding to any one of the third rotation angle $\theta 3$ and the fourth rotation angle $\theta 4$ is disposed at the reference position RL. Additionally, the control device 18 may reverse the rotation direction of the rotation shaft 14A in order to move the measurement object of the gear W to the reference position RL.

(Stress Measurement Method)

Next, a stress measurement method according to the embodiment will be described.

Figure 8:
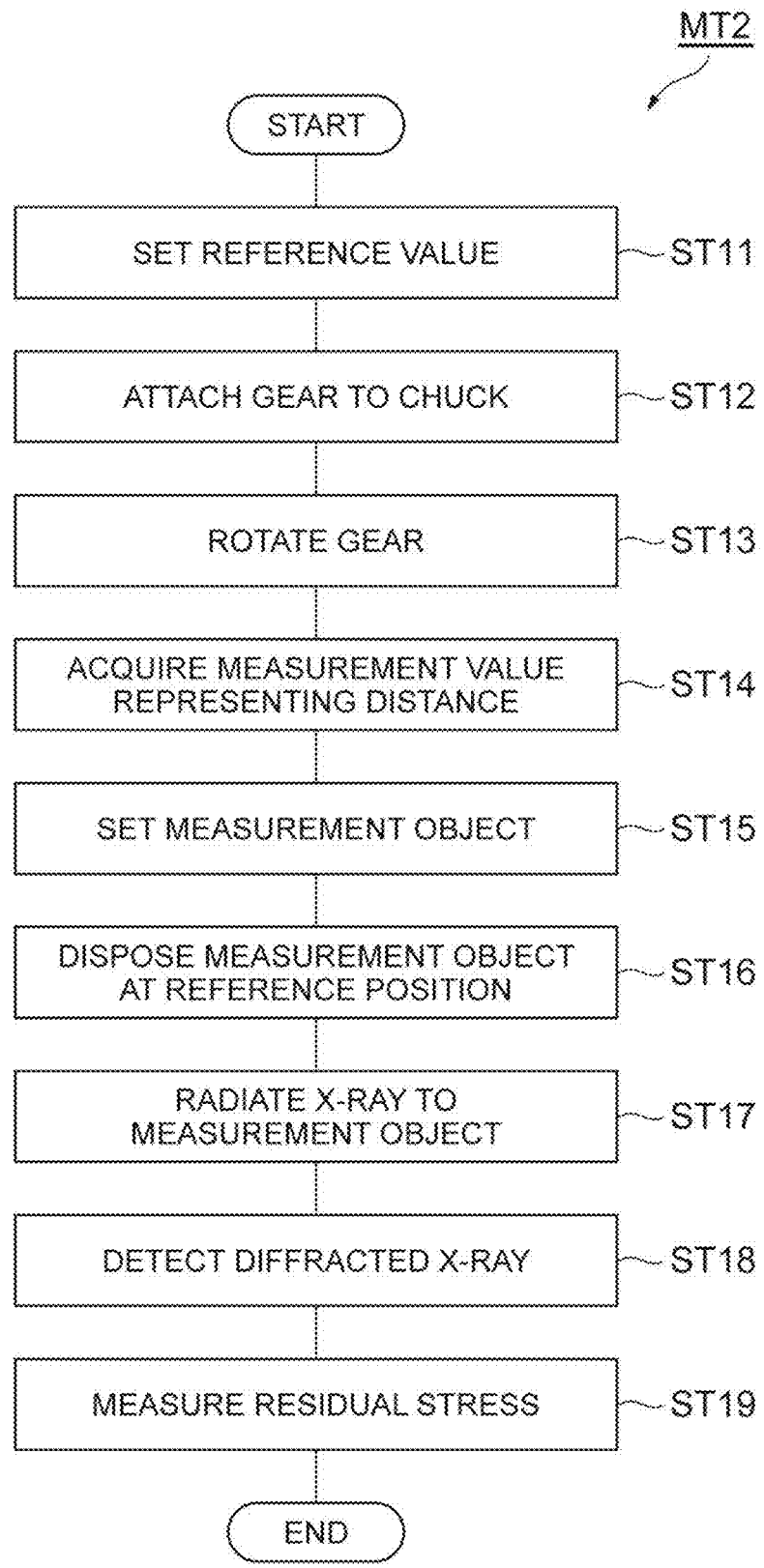
FIG. 8 is a flowchart illustrating a stress measurement method according to the embodiment.

FIG. 8 is a flowchart illustrating a stress measurement method MT2 according to the embodiment. The method MT2 is performed by using the stress measurement system 20. In the method MT2, step ST11 to step ST16 are first performed. Since step ST11 to step ST16 are the same as step ST1 to step ST6 of the method MT1, a description thereof will be omitted.

In the method MT2, step ST17 is performed subsequently. In step ST17, an X-ray is radiated from the X-ray irradiation unit 24 to the measurement object of the gear W disposed at the reference position RL in step ST16. Next, in step ST18, the X-ray diffracted by the measurement object of the gear W is detected by the first detection element 26 and the second detection element 28. Next, in step ST19, the residual stress of the measurement object of the gear W is measured from the strength of the X-ray detected by the first detection element 26 and the second detection element 28. In this way, in the stress measurement method according to the embodiment, the residual stress of the measurement object of the gear W is measured.

In an aspect and various embodiments described above, the measurement object of the gear W can be automatically positioned at the reference position. Thus, the stress of the measurement object of the gear W can be measured without any manual operation of the operator. Accordingly, the time necessary for positioning the gear W can be also shortened.

Further, in the above-described embodiment, the range of the bottom land Wz of the gear W is specified from the first matching point between the plurality of reference values and the measurement value within the first sections D1 and Da. Similarly, in the above-described embodiment, the range of the top land Wa of the gear W is specified from the second matching point between the plurality of reference values and the measurement value within the second sections D2 and Db. In this way, since the first matching point and the second matching point between the measurement value and the plurality of reference values are used, the ranges of the bottom land Wz and the top land Wa can be specified with high accuracy even when the rotation center of the gear W is eccentric with respect to the axis CL. Thus, the positioning accuracy of the gear W can be improved.

Further, in the above-described embodiment, since the plurality of reference values are used, the gears W having different dimensions, top land intervals, shapes, and the like can be positioned with high accuracy.

Further, in the above-described embodiment, since the measurement value representing the distance L is acquired by the non-contact displacement meter 16, it is possible to prevent a misalignment caused by the contact between the gear and the displacement meter 16 and to prevent a measurement error due to the influence of the material or temperature of the gear W. When an eddy current displacement meter is used as the displacement meter 16, light is not irregularly reflected during the measurement differently from the laser displacement meter and hence malfunctions due to the irregular reflection of light can be prevented.

As described above, the gear positioning device, the stress measurement system, the gear positioning method, and the stress measurement method according to various embodiments have been described. However, the invention is not limited thereto and can be modified into various forms without departing from the spirit of the invention. Hereinafter, modified examples of the stress measurement system will be described.

First Modified Example

Hereinafter, a stress measurement system according to a first modified example will be described with reference to FIGS. 9(A) and 10. FIG. 9(A) is a side view schematically illustrating a stress measurement system 30 according to the first modified example. Additionally, in the description below, a component which is substantially the same as that of the above-described embodiment will not be described and only a difference will be described.

As illustrated in FIG. 9(A), the stress measurement system 30 includes a rotation mechanism 32 for rotating the stress measurement device 22 around an axis 32X. The axis 32X extends in a direction perpendicular to a front surface 22F of the stress measurement device 22. The rotation mechanism 32 includes a rotation shaft 32A and a casing 32B. One end of the rotation shaft 32A is connected to the stress measurement device 22 and the other end of the rotation shaft 32A is rotatably supported by a bearing provided inside the casing 32B. A motor is provided inside the casing 32B. The motor applies a driving force to the rotation shaft 32A through a driving force transmission mechanism. The rotation shaft 32A rotates around the axis 32X by a driving force transmitted from the motor. A rotation force of the rotation shaft 32A is transmitted to the stress measurement device 22 so that the stress measurement device 22 rotates around the axis 32X. The motor is electrically connected to the control device 18 and its operation is controlled by a control signal transmitted from the control device 18.

In the modified example, as illustrated in FIG. 10, a case in which a gear to be inspected is the helical gear W1 is described. The helical gear W1 is a gear having tooth lines extending obliquely with respect to the rotation axis. The rotation mechanism 32 rotates the stress measurement device 22 around the axis 32X from the arrangement in which the direction of the tooth trace of the helical gear W1 (see an arrow T of FIGS. 10(A) and 10(B)) intersects the arrangement direction of the X-ray irradiation unit 24, the first detection element 26, and the second detection element 28 (see an arrow 22L of FIGS. 10(A) and 10(B)) when viewed from the X direction as illustrated in FIG. 10(A) to the arrangement in which the direction of the tooth trace of the helical gear W1 matches the arrangement direction of the X-ray irradiation unit 24, the first detection element 26, and the second detection element 28 when viewed from the X direction as illustrated in FIG. 10(B).

In an embodiment, the rotation mechanism 32 can rotate the stress measurement device 22 around the axis 32X before an X-ray is radiated from the X-ray irradiation unit 24 to the outer peripheral surface of the helical gear W1.

As described above, in the first modified example, the stress measurement device 22 is rotated so that the direction of the tooth trace of the helical gear W1 matches the arrangement direction of the X-ray irradiation unit 24, the first detection element 26, and the second detection element 28 as illustrated in FIG. 10(B) before the residual stress of the outer peripheral portion of the helical gear W1 is measured. Accordingly, the measurement accuracy of the residual stress can be improved.

Second Modified Example

Next, a stress measurement system according to a second modified example will be described with reference to FIGS. 9(B) and 10. FIG. 9(B) is a side view schematically illustrating a stress measurement system 42 according to the second modified example. Additionally, in the description below, a component which is substantially the same as that of the above-described embodiment will not be described and only a difference will be described.

As illustrated in FIG. 9(B), the stress measurement system 42 includes a gear positioning device 40 instead of the gear positioning device 10. The gear positioning device 40 includes a main body unit 40H and a rotation mechanism 46. The main body unit 4011 includes a chuck 12, a rotation drive mechanism 14, a base 44, a support 45, and a displacement meter 16. The rotation drive mechanism 14 is supported by the upper surface of the base 44. The support 45 is erected on the base 44 and the displacement meter 16 is fixed to the upper end of the support 45. Similarly to the embodiment illustrated in FIG. 4, the displacement meter 16 is disposed outside the gear W.

The rotation mechanism 46 is a device for rotating the main body unit 40H around an axis 46X extending in the X direction and includes a rotation shaft 46A and a casing 46B. One end of the rotation shaft 46A is connected to the main body unit 40H and the other end of the rotation shaft 46A is rotatably supported by a bearing provided inside the casing 46B. A motor is provided inside the casing 46B. The motor applies a driving force to the rotation shaft 46A through a driving force transmission mechanism. The rotation shaft 46A rotates around the axis 46X by a driving force transmitted from the motor. The rotation force of the rotation shaft 46A is transmitted to the main body unit 40H so that the main body unit 40H rotates around the axis 46X. The motor is electrically connected to the control device 18 and its operation is controlled by a control signal transmitted from the control device 18.

The rotation mechanism 46 rotates the main body unit 40H around the axis 46X from the arrangement in which the direction of the tooth trace of the helical gear W1 intersects the arrangement direction of the X-ray irradiation unit 24, the first detection element 26, and the second detection element 28 when viewed from the X direction as illustrated in FIG. 10(A) to the arrangement in which the direction of the tooth trace of the helical gear W1 matches the arrangement direction of the X-ray irradiation unit 24, the first detection element 26, and the second detection element 28 when viewed from the X direction as illustrated in FIG. 10(B).

Further, as illustrated in FIG. 9(B), the gear positioning device 40 further includes a robot cylinder 48. The robot cylinder 48 is connected to the rotation mechanism 46. The robot cylinder 48 moves the rotation mechanism 46 in the X direction, the Y direction, and the Z direction. That is, the robot cylinder 48 includes a first cylinder mechanism, a second cylinder mechanism, and a third cylinder mechanism for respectively moving the rotation mechanism 46 in the X direction, the Y direction, and the X direction. Additionally, since the configuration of the robot cylinder 48 is known, a detailed description of the robot cylinder 48 will be omitted. The robot cylinder 48 is connected to the control device 18 and its operation is controlled by a control signal transmitted from the control device 18.

As described above, in the second modified example, the main body unit 40H is rotated around the axis 46X so that the direction of the tooth trace of the helical gear W1 matches the arrangement direction of the X-ray irradiation unit 24, the first detection element 26, and the second detection element 28 as illustrated in FIG. 10(B) before the residual stress of the outer peripheral surface of the helical gear W1 is measured. Accordingly, the measurement accuracy of the residual stress can be improved. In an embodiment, the separation distance between the X-ray irradiation unit 24 and the measurement object of the helical gear W1 may be adjusted by adjusting the position of the main body unit 40H in the X direction, the Y direction, and the Z direction using the robot cylinder 48 before the residual stress of the outer peripheral surface of the helical gear W1 is measured.

In the second modified example, since the position of the chuck 12 in the X direction, the Y direction, and the Z direction can be moved by using the robot cylinder 48, it is possible to position the gears W of various sizes and to measure the stress thereof.

Also in the second modified example, the stress measurement device 22 may improve the measurement accuracy of the residual stress by allowing the direction of the tooth trace of the gear to match the arrangement direction of the X-ray irradiation unit, the first detection element, and the second detection element.

Additionally, various embodiments and modified examples described above can be combined within a consistent range. For example, the rotation mechanism 32 of the first modified example may be added to the second modified example. In this case, both of the stress measurement device 22 and the helical gear W1 can be rotated before the residual stress of the outer peripheral surface of the helical gear W1 is measured.

Supplementary Description of Embodiment

Additionally, in the above-described embodiment, the matching point between the measurement value of the displacement meter 16 and the plurality of reference values is specified, but one reference value may be used.

For example, a value slightly smaller than the distance from the reference point 16X to the bottom land Wz of the gear W may be set as one reference value. In that case, the control device 18 may specify the bottom land Wz of the gear from the rotation angle of the gear W corresponding to the matching point between one reference value and the measurement value within the first sections D1 and Da and control the rotation angle of the gear W so that a part of the bottom land Wz is disposed at the reference position RL.

In another example, a value slightly larger than the distance from the reference point 16X to the top land Wa of the gear W may be set as one reference value. In that case, the control device 18 may specify the top land Wa of the gear from the rotation angle of the gear W corresponding to the matching point between one reference value and the measurement value within the second sections D2 and Db and control the rotation angle of the gear W so that a part of the top land Wa is disposed at the reference position RL.

In the above-described embodiment, the control device 18 has the first control mode and the second control mode, but the control device 18 may have at least one control mode.

In the above-described embodiment, the displacement meter 16 is the non-contact displacement meter, but a contact displacement meter may be used.

In the above-described embodiment, the gear positioning device 10 is a part of the stress measurement system 20, but the gear positioning device may be independently used and may be used in combination of a detection device other than the stress measurement device. Further, in the embodiment illustrated in FIG. 1, the rotation drive mechanism 14 includes the rotation angle detection sensor 14S that detects the rotation angle of the gear W, but the rotation drive mechanism 14 may not include the rotation angle detection sensor 14S. In this case, for example, the control device 18 may acquire the rotation angle of the gear W from the number of times of performing the control of rotating the gear W by a predetermined unit angle.

REFERENCE SIGNS LIST 10, 40: gear positioning device, 12: chuck, 14: rotation drive mechanism, 14S: rotation angle detection sensor, 16: displacement meter, 16X: reference point, 18: control device, 20, 30, 42: stress measurement system, 22: stress measurement device, 24: X-ray irradiation unit, 26: first detection element, 28: second detection element, 32, 46: rotation mechanism, b11, b12, b21, b22, s11, s12, s21, s22: matching point, CL: axis, D1, Da: first section, D2, Db: second section, L: distance, R1: first region, R2: second region, R3: third region, R4: fourth region, RL: reference position, W, W1: gear, Wa: top land, Ws: tooth surface, Wz: bottom land, θ1: first rotation angle, θ2: second rotation angle, θ3: third rotation angle, 04: fourth rotation angle.

The invention claimed is:

1. A gear positioning device comprising:
a chuck configured to hold a gear;
a rotation drive mechanism configured to rotationally drive the chuck so that the gear rotates around a predetermined rotation axis;
a displacement meter configured to continuously or periodically acquire a measurement value representing a distance between a reference point located outside the gear and an outer peripheral surface of the gear while rotating the gear; and
a control device configured to set a part of the outer peripheral surface of the gear as a measurement object on the basis of a rotation angle of the gear, the measurement value, and at least one predetermined reference value and control the rotation drive mechanism so that the measurement object is disposed at a reference position.

2. The gear positioning device according to claim 1, wherein the control device acquires the rotation angle of the gear when the measurement value matches at least one predetermined reference value and controls the rotation drive mechanism so that the part of the outer peripheral surface of the gear is disposed at the reference position on the basis of the acquired rotation angle of the gear.

3. The gear positioning device according to claim 1, wherein the at least one reference value includes a plurality of reference values, and
wherein the control device has at least one control mode of a first control mode of extracting a first section in which the measurement value increases once and then decreases in response to the rotation of the gear from correlation data representing a relationship between the rotation angle of the gear and the measurement value, specifying a bottom land of the gear on the basis of a first matching point associated with the largest measurement value among a plurality of matching points between the plurality of reference values and the measurement value within the first section, and controlling the rotation drive mechanism so that a part of the bottom land is disposed at the reference position, and a second control mode of extracting a second section in which the measurement value decreases once and then increases in response to the rotation of the gear from the correlation data, specifying a top land of the gear on the basis of a second matching point associated with the smallest measurement value among the plurality of matching points between the plurality of reference values and the measurement value within the second section, and controlling the rotation drive mechanism so that a part of the top land is disposed at the reference position.

4. The gear positioning device according to claim 3, wherein the control device has the first control mode, and
wherein in the first control mode, the control device controls the rotation drive mechanism so that a position on the bottom land corresponding to the first matching point is disposed at the reference position.

5. The gear positioning device according to claim 3, wherein the control device has the first control mode,
wherein the first section includes a first region in which the measurement value increases in response to the rotation of the gear and a second region in which the measurement value decreases in response to the rotation of the gear, and
wherein in the first control mode, the control device specifies a first rotation angle of the gear corresponding to the first matching point within the first region and a second rotation angle of the gear corresponding to the first matching point within the second region and controls the rotation drive mechanism so that a position on the bottom land corresponding to an intermediate rotation angle between the first rotation angle and the second rotation angle is disposed at the reference position.

6. The gear positioning device according to claim 3, wherein the control device has the second control mode, and
wherein in the second control mode, the control device controls the rotation drive mechanism so that a position on the top land corresponding to the second matching point is disposed at the reference position.

7. The gear positioning device according to claim 3, wherein the control device has the second control mode,
wherein the second section includes a third region in which the measurement value decreases in response to the rotation of the gear and a fourth region in which the measurement value increases in response to the rotation of the gear, and
wherein in the second control mode, the control device specifies a third rotation angle of the gear corresponding to the second matching point within the third region and a fourth rotation angle of the gear corresponding to the second matching point within the fourth region and controls the rotation drive mechanism so that a position on the top land corresponding to an intermediate rotation angle between the third rotation angle and the fourth rotation angle is disposed at the reference position.

8. The gear positioning device according to claim 1, wherein the displacement meter is configured to measure the distance between the reference point located outside the gear and the outer peripheral surface of the gear in a non-contact manner.

9. The gear positioning device according to claim 1, wherein the displacement meter is an eddy current displacement sensor.

10. A stress measurement system comprising:
the gear positioning device according to claim 1; and
a stress measurement device configured to measure a residual stress of the outer peripheral surface of the gear,
wherein the stress measurement device includes an X-ray irradiation unit configured to radiate an X-ray to a part of the outer peripheral surface of the gear disposed at the reference position, a first detection element configured to detect an X-ray diffracted in the part of the outer peripheral surface of the gear at a first detection position, and a second detection element configured to detect an X-ray diffracted in the part of the outer peripheral surface of the gear at a second detection position different from the first detection position.

11. The stress measurement system according to claim 10, wherein the X-ray irradiation unit, the first detection element, and the second detection element are linearly arranged, and
wherein the stress measurement system further comprises a rotation mechanism configured to rotate at least one of the stress measurement device and the chuck so that a direction of a tooth trace of the gear matches an arrangement direction of the X-ray irradiation unit, the first detection element, and the second detection element.

12. The stress measurement system according to claim 10, wherein the reference position is a position facing the X-ray irradiation unit.

13. A gear positioning method comprising steps of:
attaching a gear to a chuck;
rotationally driving the chuck so that the gear rotates around a predetermined rotation axis;
continuously or periodically acquiring a measurement value representing a distance between a reference point located outside the gear and an outer peripheral surface of the gear while rotating the gear; and
setting a part of the outer peripheral surface of the gear as a measurement object on the basis of a rotation angle of the gear, the measurement value, and at least one predetermined reference value and adjusting the rotation angle of the gear so that the measurement object is disposed at a reference position.

14. The gear positioning method according to claim 13, wherein in the step of adjusting of the rotation angle of the gear, the rotation angle of the gear when the measurement value matches the at least one predetermined reference value is acquired and the rotation angle of the gear is adjusted so that the part of the outer peripheral surface of the gear is disposed at the reference position on the basis of the acquired rotation angle of the gear.

15. The gear positioning method according to claim 14, wherein the at least one reference value includes a plurality of reference values, and
wherein in the step of adjusting of the rotation angle of the gear, a first section in which the measurement value increases once and then decreases in response to the rotation of the gear is extracted from correlation data representing a relationship between the rotation angle of the gear and the measurement value, a bottom land of the gear is specified on the basis of a first matching point associated with the largest measurement value among a plurality of matching points between the plurality of reference values and the measurement value within the first section, and the rotation angle of the gear is adjusted so that a part of the bottom land is disposed at the reference position.

16. The gear positioning method according to claim 14, wherein the at least one reference value includes a plurality of reference values, and
wherein in the step of adjusting of the rotation angle of the gear, a second section in which the measurement value decreases once and then increases in response to the rotation of the gear is extracted from correlation data representing a relationship between the rotation angle of the gear and the measurement value, a top land of the gear is specified on the basis of a second matching point associated with the smallest measurement value among a plurality of matching points between the plurality of reference values and the measurement value within the second section, and the rotation angle of the gear is adjusted so that a part of the top land is disposed at the reference position.

17. The gear positioning method according to claim 15, wherein in the step of adjusting of the rotation angle of the gear, the rotation angle of the gear is adjusted so that a position on the bottom land corresponding to the first matching point is disposed at the reference position.

18. The gear positioning method according to claim 15, wherein the first section includes a first region in which the measurement value increases in response to the rotation of the gear and a second region in which the measurement value decreases in response to the rotation of the gear, and
wherein in the step of adjusting of the rotation angle of the gear, a first rotation angle of the gear corresponding to the first matching point within the first region and a second rotation angle of the gear corresponding to the first matching point within the second region are specified and the rotation angle of the gear is adjusted so that a position on the bottom land corresponding to an intermediate rotation angle between the first rotation angle and the second rotation angle is disposed at the reference position.

19. The gear positioning method according to claim 16, wherein in the step of adjusting of the rotation angle of the gear, the rotation angle of the gear is adjusted so that a position on the top land corresponding to the second matching point is disposed at the reference position.

20. The gear positioning method according to claim 16, wherein the second section includes a third region in which the measurement value decreases in response to the rotation of the gear and a fourth region in which the measurement value increases in response to the rotation of the gear, and
wherein in the step of adjusting of the rotation angle of the gear, a third rotation angle of the gear corresponding to the second matching point within the third region and a fourth rotation angle of the gear corresponding to the second matching point within the fourth region are specified and the rotation angle of the gear is adjusted so that a position on the top land corresponding to an intermediate rotation angle between the third rotation angle and the fourth rotation angle is disposed at the reference position.

21. A stress measurement method of measuring a residual stress of an outer peripheral surface of a gear by a stress measurement device including an X-ray irradiation unit configured to radiate an X-ray to a part of the outer peripheral surface of the gear, a first detection element configured to detect an X-ray diffracted in the part of the outer peripheral surface of the gear at a first detection position, and a second detection element configured to detect an X-ray diffracted in the part of the outer peripheral surface of the gear at a second detection position different from the first detection position, the stress measurement method comprising steps of:
attaching the gear to a chuck;
rotationally driving the chuck so that the gear rotates around a predetermined rotation axis;
continuously or periodically acquiring a measurement value representing a distance between a reference point located outside the gear and an outer peripheral surface of the gear while rotating the gear;

setting a part of the outer peripheral surface of the gear as a measurement object on the basis of a rotation angle of the gear, the measurement value, and at least one predetermined reference value and adjusting the rotation angle of the gear so that the measurement object is disposed at a position facing the X-ray irradiation unit;

radiating an X-ray from the X-ray irradiation unit toward the measurement object;

detecting an X-ray diffracted in the measurement object by the first detection element and the second detection element; and measuring a residual stress of the measurement object on the basis of detection values of the first detection element and the second detection element.

22. The stress measurement method according to claim 21, wherein in the step of adjusting of the rotation angle of the gear, the rotation angle of the gear when the measurement value matches the at least one predetermined reference value is acquired and the rotation angle of the gear is adjusted so that the part of the outer peripheral surface of the gear is disposed at a position facing the X-ray irradiation unit on the basis of the acquired rotation angle of the gear.

23. The stress measurement method according to claim 21, wherein the X-ray irradiation unit, the first detection element, and the second detection element are linearly arranged, and wherein the stress measurement method further comprises a step of rotating at least one of the stress measurement device and the chuck so that a direction of a tooth trace of the gear matches an arrangement direction of the X-ray irradiation unit, the first detection element, and the second detection element before the irradiation of the X-ray.

* * * * *